United States Patent

[11] 3,619,073

| [72] | Inventors | Michel Ossona De Mendez<br>26 Rue Coriolis, 75 Paris (12°);<br>Albert Foucard, 40 Chemin de Meaux, 93,<br>Gagny; Jacques Verin, 15 Rue Feron, 95<br>Montmorency, all of France |
|---|---|---|
| [21] | Appl. No. | 879,797 |
| [22] | Filed | Nov. 25, 1969 |
| [45] | Patented | Nov. 9, 1971 |
| [32] | Priority | Dec. 2, 1968 |
| [33] | | France |
| [31] | | 176,183 |

[54] SAMPLE HOLDER FOR OPTICAL MEASUREMENTS AT LOW TEMPERATURES
15 Claims, 5 Drawing Figs.

| [52] | U.S. Cl. | 356/246 |
|---|---|---|
| [51] | Int. Cl. | G01n 1/10 |
| [50] | Field of Search | 250/43.5;<br>356/246 |

[56] References Cited
OTHER REFERENCES

Holden et al., " A variable Thickness Low Temperature Infra-Red Cell," Journal of the Optical Society of America, Vol. 40, No. 11, Nov., 1950, pp. 757– 760.

*Primary Examiner*—Ronald L. Wibert
*Assistant Examiner*—Orville B. Chew, II
*Attorney*—Bacon & Thomas ABSTRACT: A sample-holding apparatus for carrying out optical measurements at low temperatures, comprising a block forming a heat reservoir which includes a cavity of tapered cross section, a container for a sample, the shape of which is matched to that of the cavity to permit transfer of heat by contact between the block and the container even when the container is initially at a higher temperature than the block and contracts as it cools, a heating device, and a cooling device for said block, and a temperature control device for controlling the heating and cooling devices.

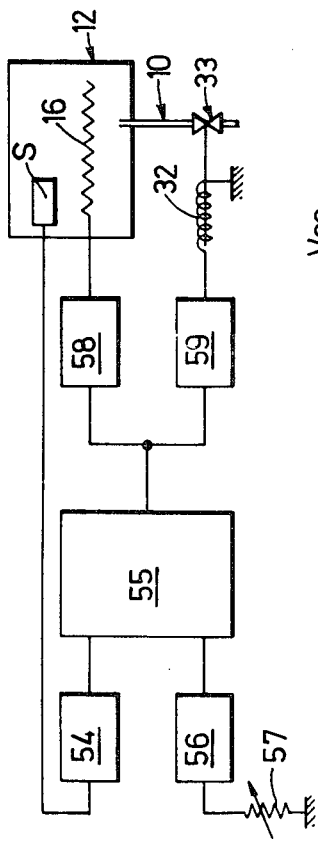
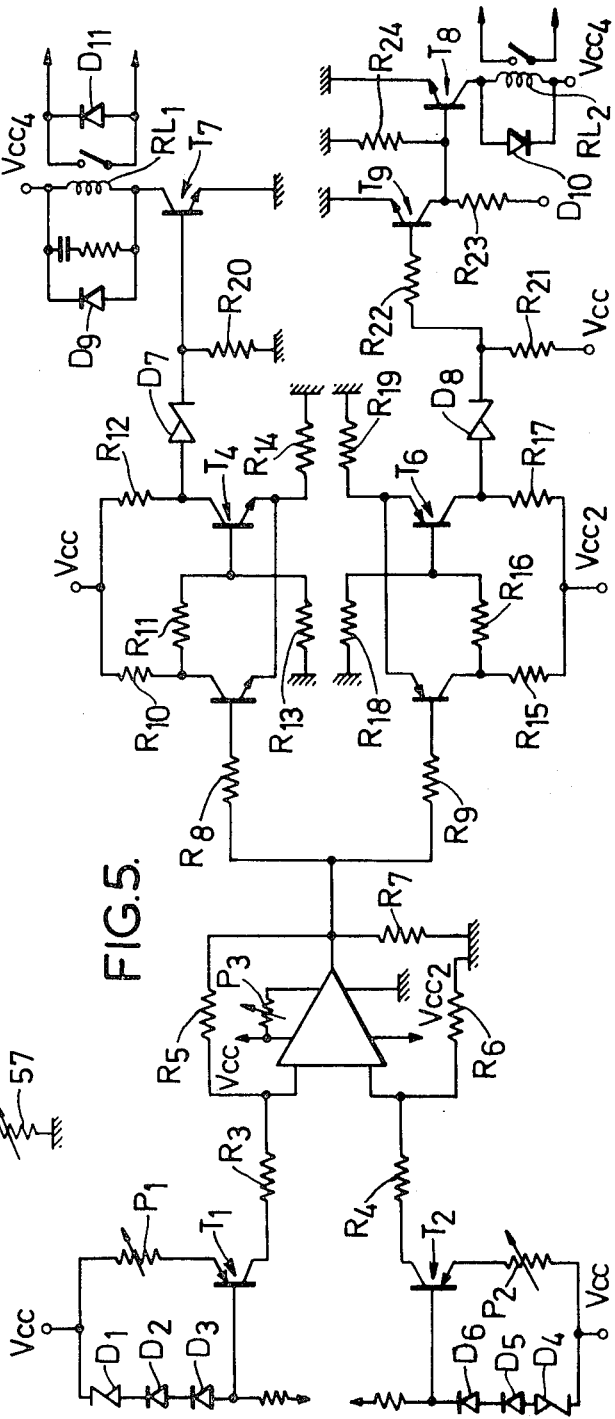
FIG.4.
FIG.5.
INVENTORS
MICHEL OSSONA DE MENDEZ
ALBERT FOUCARD
JACQUES VERIN
BY Bacon & Thomas
ATTORNEYS

SAMPLE HOLDER FOR OPTICAL MEASUREMENTS AT LOW TEMPERATURES

The present invention relates to a sample-holding apparatus suitable for use when taking optical measurements at low temperatures and refers more particularly to an apparatus in which a product may be analyzed by dichroism, polarimetry, spectroscopy measurements and other optical measurements at temperatures between 77° and 320° K.

The present invention provides a sample-holding apparatus for carrying out optical measurements at low temperatures comprising a heat-insulated enclosure within which is mounted a block which is a good conductor of heat forming a heat reservoir and which includes a cavity of tapered cross section, a container for a sample, the shape of which is matched to that of said cavity so as to permit transfer of heat by contact between the block and the container to cause equalization of the temperatures of the block and the sample, a heating device and a cooling device for said block, and a temperature control device for controlling the heating device and the cooling device so as to maintain the temperature of the block at a predetermined value.

According to a preferred embodiment of the invention said block comprises a double-walled body, surrounding said tapered cavity which is preferably in the central part of said block. The cooling device includes means for introducing a cooling fluid into the space between the two walls of the double walled body.

Preferably the apparatus includes a tank for cooling fluid having an inlet and an outlet for cooling fluid, said inlet and outlet being in the upper wall of the body of the block and being connected respectively to a feed pipe and a discharge pipe for the fluid. Preferably the heating device of the block consists of electrical heating coils embedded in that part of the block which defines said cavity.

Other characteristics and advantages of the invention will become apparent from the following description.

A preferred embodiment of the invention is shown in the attached drawings, and is given by way of example only.

FIG. 4 is a block diagram of a control device for the apparatus according to the invention;

FIG. 5 is a detailed electrical circuit of the control device of FIG. 4.

Figure 1:
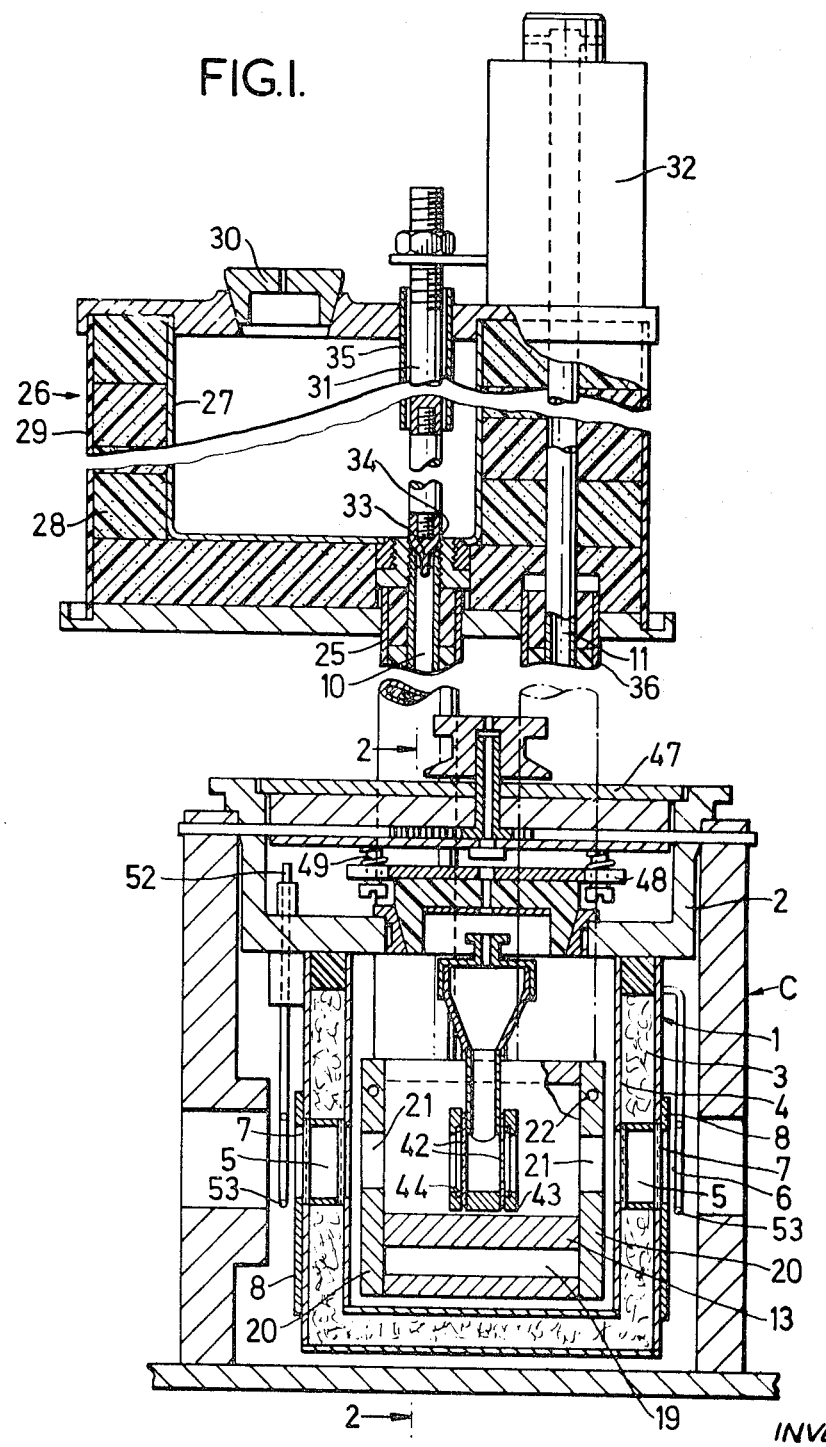
FIG. 1 is a sectional elevation of a sample holder according to the invention.

The sample holder shown in the drawings is adapted to be used with a Roussel-Jouan dichrograph.

Referring firstly to FIG. 1 the apparatus is made up of a heat-insulated enclosure formed within a box 1, carried by a support 2, this box 1 being supported by the support 2 by the measurement compartment C of the dichrograph.

The box 1 is formed from two coaxial shells 3,4 one arranged within the other. These shells 3,4 can either be made of a plastics material, for example, aluminized polyvinyl chloride, or of metal, for example, polished stainless steel. The shells 3,4 are spaced from one another and the annular space between the two shells 3,4 and the space provided between their bases are filled with an insulating material of the expanded polystyrene type or any other polymer with a urethane base.

Two portholes 5 are arranged in opposite walls of the box 1 so as to permit a light beam to pass through the enclosure without its physical properties being changed. Each of the portholes 5 is formed from a capsule 7 of quartz of Suprasil quality, for example, and sealed in vacuo. The vacuum in the capsules 7 is about $10^{16}$ mm.Hg. The capsules 7 are mounted in the wall of the box 1 in such a way that they bear against shell 4 and are fixed to shell 3 by means of flanges 8.

The support 2 is made of, for example, "Plexiglas." It has in its central part an orifice 9 through which a sample to be studied may be introduced, the orifice 9 being sealed by a removable sealing device which will be subsequently described. The support 2 has, in addition, two other orifices through which pass respectively a feed pipe 10 for passing liquefied gas into the enclosure and a pipe 11 for discharging this gas.

Figure 2:
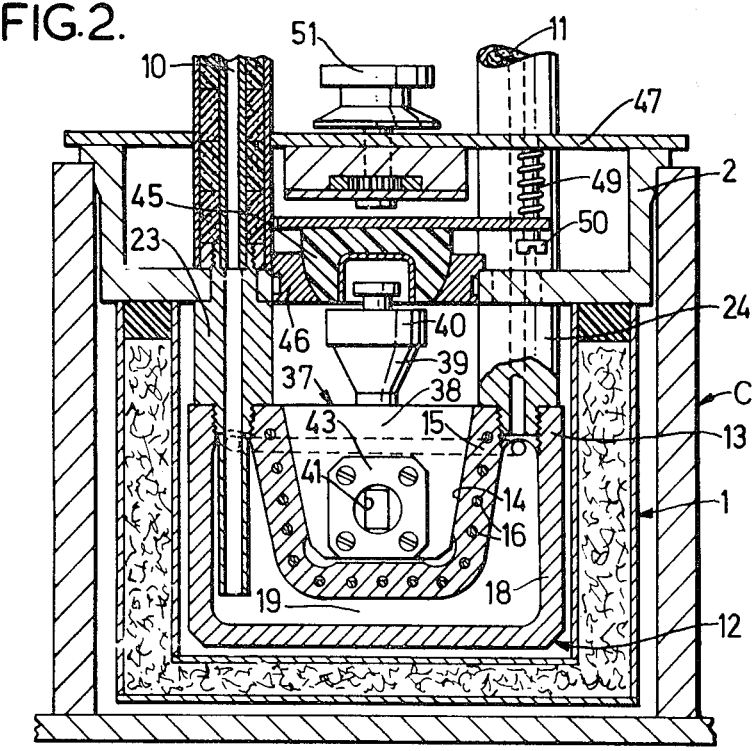
FIG. 2 is a section of part of the sample holder taken on the line 2—2 of FIG. 1.

Inside the heat-insulated enclosure formed by the box 1 and the support 2 is mounted a block 12 (see FIG. 2) made of a metal which is a good heat conductor and which has good mechanical properties at low temperatures.

In the embodiment shown the metal used is electrolytic copper but it is also possible to use aluminum, copper and alloys, alloys of the Martensite aging type of any other alloy or metal having good mechanical characteristics and an adequate thermal conductivity between 77° and 320° K.

The metal block 12 is intended to serve as a heat reservoir and to transfer by conduction alone the desired temperature to the sample to be analyzed.

The metal block 12 is made in three parts. It comprises a body 13 with a double wall, the central part of the body 13 having a cavity 14 (FIG. 2) of tapered cross section (i.e. of trapezoidal cross section slightly rounded towards the base), in such a way as to facilitate the introduction of a container of complementary shape which contains the sample to be studied. In the wall 15 which defines the cavity 14 are embedded electrical heating coils 16 intended to cause any necessary temperature rise of the copper block during the regulation of the temperature in the enclosure. The heating coils 16 are placed as near as possible to the outer edge of the wall 15 so that the block 12 performs its function as a heat reservoir under the best possible conditions.

Figure 3:
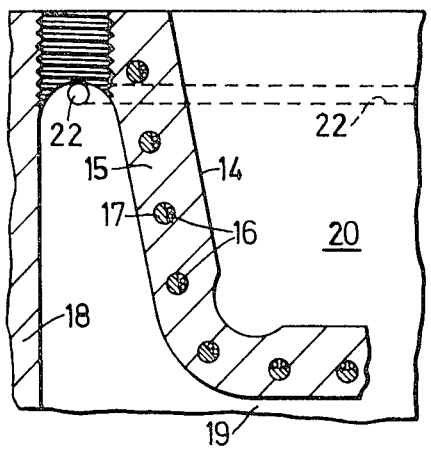
FIG. 3 is a sectional view on a larger scale of part of the block of the sample holder which forms a heat reservoir and shows the resistors of the heating device.

These heating coils 16 could also be placed outside the wall 15, for example, by brazing. The action of the heating coils 16 is limited to the central part of the block by strips 17 of heat insulating material placed around that part of the coils facing the outer surface of the wall 15 (FIG. 3).

The heating coils are interconnected in conventional manner and are connected to a power source (not shown).

Between the inner wall 15 of the metal block 12 and a second wall 18 of this block there is a cavity 19 forming a reservoir for a cooling fluid. In the embodiment described the cooling fluid is liquid nitrogen. The body 13 of the block 12 is manufactured in one part, either by machining or casting.

Onto each side of the body 13 are screwed plates 20, a hole 21 (FIG. 1) being drilled through each of said plates to permit the passage of light for examining the sample. In the preferred embodiment, plates 20 are applied to the body 13 without a separate seal, which necessitates careful finishing of the surfaces facing the plates and of the walls of body 13 to which they are applied. However, a separate seal between the plates 20 and the body 13 may be used if desired.

Each of the plates 20 has a hole 22 through its upper part serving for removal of the gaseous nitrogen resulting from the heating of the block 12. The holes 22 communicate on one side with the upper parts of the cavity 19 and on the other side with the discharge pipe 11.

The block 12 is protectively coated with gold produced, for example, by electrolytic deposition, in order to prevent any corrosion.

The metal block 12 forming the heat reservoir is suspended on the support 2 by stays 23,24 which also serve as connections between the pipes 10, 11, respectively and the liquid nitrogen cavity 19. A third stay (not shown) completes the fixture of the block 12 to the support 2.

The length of the stays 23,24 is such that the holes 21 made in the plates 20 of the body 12 will be disposed coaxially with respect to the portholes 5 of the heat insulated enclosure.

The liquid nitrogen feed pipe 10 which is placed in a sheath 25 of thermal insulation lined with an insulating material such as expanded polystyrene, opens at its upper end into the bottom of a main liquid nitrogen tank 26. The tank 26 is made up of a container 27 in stainless steel which is heat insulated by a layer 28 of expanded polystyrene, the layer 28 being protected by an envelope 29 of plastic material of the polyvinyl chloride type. It has in its upper part a filling aperture closed by a plug 30.

A sliding rod 31 mounted in the upper part of the container 26 and controlled by an electromagnet 32 serves to close the liquid nitrogen supply pipe 10. To close the pipe 10, the rod 31 has at its lower end a tip 33 which seats on a hemispherical seat 34 formed in the base of the container 27 at the mouth of the pipe 10. The rod 31 is slidably fitted in a sleeve 35 fixed to the upper part of the tank 26 and its travel can be controlled according to the quantity of nitrogen which it is desired to introduce into the container 19 of the block 12.

The gaseous nitrogen discharge pipe 11 is also placed in a sheath 36 of thermal insulation lined with expanded polystyrene and passes through the polystyrene layer 28 of the tank 26 to discharge into the atmosphere.

The metal block 12 carried by the support 2 and contained in the box 1 in turn supports a small container 37 which serves to carry the sample to be studied. The container 37 comprises a metal body whose large end surfaces 38 are parallel and have a trapezoidal outline matching the shape of the cavity 14 of the block 12. The distance between the parallel surfaces 38 of the container 37 is determined by the desired thickness of the sample.

The body of the container 37 can be made of electrolytic copper, aluminum or any other metal or alloy with good mechanical characteristics and with a good thermal conductivity in the temperature range between 77° and 320° K.

The sloping, tapering surfaces of the container 37 will be in contact with the walls of the cavity 14 in block 12 in such a way that heat may be transferred through the walls 14 and such surfaces to the sample contained in the container 37, so as to equalize the temperature of the sample and the walls of the cavity 14. The body of the container 37 is surmounted by a funnel 39 closed by a plug 40 of "Teflon." The funnel 39 forms an expansion chamber for the sample contained in the tank 37. Indeed, most of the solvents used at 77° K have, when they solidify, a large contraction of the order of 30 percent. It is therefore necessary to have an excess of liquid so that the product to be analyzed always fills the space through which, in operation, the light beam passes and this excess may be housed in the funnel 39.

The surfaces 38 of the container 37 have holes 41 at such a height that when the container 37 is placed in the metal block 12 they are centered with respect to the light beam axis. The sealing and transparency of the container 37 at the level of the holes 41 is provided by two disks 42 made of quartz of, for example, Suprasil quality held by plates 43, a spring 44 or a washer placed between each disk 42 and each plate 43 ensuring better sealing.

The optical length within the sample contained in the container 37 can vary from 5 to 50mm. In view of the importance of accurately knowing the optical length covered, the surfaces 38 of the metal body of the container 37 must be machined with an accuracy of the order of $\pm 5\mu$.

The detachable sealing device for closing the support 2 after introduction of the container 37 in the heat insulated enclosure comprises a plug 45 made of an elastomer, for example "Silastene," this plug 45 fitting into a ring 46 mounted on the aperture 9 of the support so as to seal the enclosure against atmospheric air which would cause frost and made measurements impossible. A cover 47 for providing pressure on the plug 45 is fixed to the support 2. The cover 47 carries a plate 48 mounted on springs 49 the tension of which are adjustable by screws 50; this plate 48 exerts a suitable pressure on the plug 45 and a locking button 51 operates a rack and pinion mechanism for example to ensure a satisfactory fixing of the cover 47 to the support 2.

The cover 47 is provided with a safety device (not shown) for disconnecting the sensitive element of the optical measuring apparatus with which the sample-holding apparatus according to the invention is to be associated, as soon as the cover 47 is unlocked. In the case of a dichrograph which includes a photomultiplier, this device is particularly important because it prevents the dazzling of the photomultiplier by ambient light.

A feed pipe 52 for gaseous nitrogen at ambient temperature is additionally provided between the support 2 and the cover 47. This gas is distributed over several points in such a way as to prevent frosting of the essential parts of the apparatus. The distributed gaseous nitrogen is mainly intended to create a nitrogen barrier above the central orifice of the support 2 when the plug 45 is removed. This nitrogen barrier is obtained via the ring 46 through which are drilled small gas distribution holes (not shown).

Nitrogen distribution pipes 53 for preventing any condensation are provided round the portholes 5. If necessary the nitrogen can be heated to 30° C.

The cover 47, the locking button 51 and the plug 45 are drilled in such a way as to provide a passage for a thermocouple permitting the sample temperature to be measured.

A platinum resistance probe S (FIG. 4) is placed on the wall 15 of the block 12 forming the heat reservoir to permit the temperature of the apparatus to be regulated.

The device for regulating the temperature of the block 12 is shown schematically in FIG. 4. It comprises the platinum resistance probe S connected to a constant current generator 54.

The output of the generator 54 is connected to the input of a differential amplifier 55, the other input of which is connected to the output of a second constant current generator 56 which supplies a reference signal corresponding to the temperature at which the sample should be kept.

The value of the reference signal is controlled by a variable resistor 57 connected to the input of the generator 56. The output of the amplifier 55 is connected on the one hand to a device 58 for controlling the heating of the heating coils 16 of the block 12 and on the other to a device 59 controlling the admission of liquid nitrogen to the tank 19 of block 12.

The operation of the sample-holding apparatus will be described with particular reference to FIG. 5 which shows in greater detail the temperature regulation device. With the apparatus in the measuring compartment C of the dichrograph the container 37 carrying a sample to be studied is placed in the enclosure. The trapezoidal shape of the container 37 matches the shape of the cavity 14 of the body 12. Then, after inserting the plug 45 and locking the cover 47, heating or cooling takes place.

To this end the electronic device for regulating the temperature is connected up after setting the variable resistor 57 (FIG. 4), to a position corresponding to the temperature at which the sample is to be kept. The temperature is then attained automatically by introducing a suitable quantity of liquid nitrogen from tank 26 into the tank 19 of the metal block 12. A constant current supplied by the current generator 54 passes through the probe S mounted on the block 12; the probe resistance is therefore proportional to the temperature of the block 12.

The generator 54 supplied with a DC voltage $V_{cc}$ comprises (FIG. 5) a transistor $T_1$, the base voltage of which is fixed by a Zener diode $D_1$. Its emitter voltage is also therefore fixed. The value of the current at the emitter of the transistor $T_1$ is fixed. A variable resistor $P_1$ serves to regulate the current to the desired value.

Two diodes $D_2$ and $D_3$ make it possible to compensate for the variations of the Zener diode and the base-emitter voltage of the transistor $T_1$ as a function of the temperature.

The variable resistance of the probe S varies the output signal of the generator 54. This output signal is applied to an input of the differential amplifier 55 in which it is compared with a reference signal corresponding to the temperature value which the block 12 and the sample should reach. This reference signal is provided by the generator 56, the input of which is connected to the variable resistor 57.

Generator 56 is identical to generator 54. It consists of a transistor $T_2$, a Zener diode $D_4$, two diodes $D_5$ and $D_6$ and a setting variable resistor $P_2$. The generators 54 and 56 are connected to two inputs of the differential amplifier by resistors $R_3$ and $R_4$ respectively.

The amplifier 55 comprises an operational amplifier mounted in a differential amplifier and of which the gain has been calculated so that the threshold voltage i.e. the difference between the two input voltages which corresponds to the selected maximum allowable variation of temperature from the selected maximum allowable variation of temperature from the selected temperature gives an output equal to the minimum value necessary for activating the devices 58 and 59 controlling the cooling or heating. If the difference between the input voltages becomes large, the amplifier becomes saturated with positive or negative voltage but during the return to the selected temperature the amplifier recovery time is much less than the time taken by the block 12 to exceed said maximum allowable variation.

If the temperature of the block 12 is below the desired temperature indicated on the variable resistor 57 the device controlling the heating of the block 12 must be activated. The output voltage of the amplifier 55 is positive and tends to activate the control device 58, which control device 58 includes a bistable circuit having two transistors $T_3$ and $T_4$. A Zener diode $D_7$ is connected to the output of the bistable circuit. The Zener diode $D_7$ is connected to a power transistor $T_7$ which controls a relay $RL_1$ for closing the electrical supply circuit to the resistors 16 embedded in the block 12. The bistable circuit is designed in such a way that when the voltage at its input is below its switching threshold, transistor $T_3$ is blocked, whilst transistor $T_4$ is conducting which results in the blocking of transistor $T_7$ and relay $RL_1$ is not energized.

If the input voltage reaches the predetermined threshold voltage the bistable circuit switches which makes transistor $T_7$ conductive, relay $RL_1$ is energized and closes the supply circuit of the heating coils 16. The temperature in the block 12 and in the container 37 containing the sample rises and the voltage difference at the input of the circuit decreases which causes a drop in the output voltage of the amplifier 55. When this voltage reaches a threshold value which can be equal to the first switching threshold of the bistable relay $T_3$, $T_4$ or different therefrom, the bistable circuit is restored to its initial condition and interrupts the supply to the heating coils 16 of the block 12. If the temperature of the block 18 is above the desired temperature, the cooling control circuit of the block 12 must be activated.

The output voltage of the amplifier 55 is negative and tends to activate the cooling control device 59 which is made up of a bistable circuit with two transistors $T_5$, $T_6$. A Zener diode $D_8$ is connected to the output of the bistable circuit. The Zener diode $D_8$ is connected to a power transistor $T_8$. The latter controls a relay $RL_2$ for closing the supply circuit of the electromagnet 32 which electromagnet operates the rod 31 which closes the liquid nitrogen feed pipe 10 in the tank 19 of the block 12.

The operation of device 59 is identical to that of device 58 except that the switching threshold or thresholds of its bistable circuit $T_5$, $T_6$ are designed for negative voltages.

The temperature of the block 12 and the container 37 falls and causes an increase in the output voltage of the amplifier 55. When this voltage reaches a determined threshold the bistable circuit returns to its original state and brings about the interruption of the power supply to the electromagnet 32 and the interruption of the passage of liquid nitrogen into the cavity 19 of the block 12.

If the temperature of the block 12 is approximately equal to the desired temperature, i.e. in a given range on either side of this value, the output voltage of the amplifier 55 falls between the starting thresholds of the control devices 58 and 59 and no heating or cooling of the block 12 takes place.

It is often necessary to introduce a sample to be studied during operation, with the sample-holding device, already at low temperature. It is then necessary to unlock the cover 47 and remove the plug 45 in order to effect the necessary operations.

The inlet 52 for gaseous nitrogen makes it possible to establish a nitrogen gas barrier in the orifice which prevents the penetration of atmospheric air and the formation of frost in the heat-insulated enclosure.

The trapezoidal (i.e. tapered) shape of the cavity 14 of the body 12 and the container 37 containing the sample facilitates the introduction of the latter into the heat insulated enclosure. Indeed, when the block 12 is at a temperature of 77° K it is sometimes necessary to insert a container 37 which is at ambient temperature. Good thermal contact is necessary between the container 37 and the block 12. It is therefore necessary for the dimensions of the cavity 14 and the container 37 to be accurately matched. However, the expansion and contraction phenomena to which the bodies are subjected during large temperature variations would either cause poor contact between the container 37 and the block 12 or prevent the introduction of the container in the block, if these latter were not of tapered cross section. It would therefore be necessary to cool the container 37 prior to its introduction in the block 12. However, with the apparatus according to the invention the trapezoidal shape of the members which are in contact makes possible properly to introduce the container 37 into the cavity 14 of the body 12 so as to close the heat-insulated enclosure. Then, as cooling continues the container 37 contracts, its outer wall sliding along the walls of the cavity 14 until it reaches the desired position.

The above-described arrangement is in compact form. It is easy to operate with a small consumption of cooling liquid and it is possible to regulate the temperature with an accuracy greater than ±0.5° K.

The shape and arrangement of the metal block and the container 37 containing the sample are such as to produce isotherms which, during the cooling of the sample, are concentric with the optical axis through the sample. This enables a uniform behavior of the sample along the optical axis to take place during cooling and when the desired temperature is reached a constant temperature is maintained along that axis at all points of the sample in spite of thermal losses.

In the apparatus which has been described the cavity 14 of block 12 is of trapezoidal cross section, bit it is obvious that this cavity can be of semicylindrical cross section or any other convenient cross section, the shape of the container carrying the sample being matched to the cross section of the cavity 14.

It can, for example, be adapted to take special containers such as containers of the 229QS type of the Hellma Company where the optical length covered is very small, of the order of 1 to 2mm. The gaseous nitrogen discharge pipe 14 passes through the insulating wall 28 of the main container 26 but it may discharge at any convenient point provided that the gaseous nitrogen passes into the atmosphere sufficiently far from the apparatus to prevent any frost formation.

The cooling fluid used is liquid nitrogen. However, it is also possible to use a different cooling fluid brought to the desired temperature.

Naturally the invention is not limited to the details of the embodiment represented and described which has only been chosen as an example.

What we claim is:

1. A sample-holding apparatus for carrying out optical measurements at low temperatures, comprising, a heat-insulated enclosure; a block which is a good conductor of heat forming a heat reservoir within said enclosure; a cavity of tapered cross section within the block; a container for a sample, the shape of which is matched to that of said cavity, so as to permit transfer of heat by contact between the block and the container to cause equalization of the temperatures of the block and the sample; means in said block and in said heat insulated enclosure permitting the passage of light into and out of said container; a heating device for said block; a cooling device for said block; and a temperature control device for controlling the heating device and the cooling device.

2. Apparatus as claimed in claim 1 in which said block comprises a double walled body surrounding said tapered cavity and the cooling device includes means for introducing a cooling fluid into the space between the two walls of the double walled body.

3. Apparatus as claimed in claim 2 including a tank for cooling fluid, an inlet and an outlet in said tank for cooling fluid, said inlet and outlet being in the upper wall of the body of the block, a feed pipe for the fluid being connected to the inlet and a discharge pipe for the fluid being connected to the outlet.

4. Apparatus as claimed in claim 3 in which said heat insulated enclosure has double walls, a support made of insulating material carrying said heat insulated enclosure, said block being suspended on said support by stays which also serve as connections between the cooling fluid inlet and outlet on the one hand and the feed and discharge pipes for said fluid on the other.

5. Apparatus as claimed in claim 3 in which there is provided a main tank connected to the cooling fluid pipe, a valve controlled by said temperature control device being provided to control the filling of the cooling fluid to the space between the walls of the blocks.

6. Apparatus as claimed in claim 1 in which the heating device, controlled by the said temperature control device, comprises heating coils embedded in that part of the block which defines said cavity, the said heating coils being insulated from the wall containing them in the direction extending outwardly of said cavity.

7. Apparatus as claimed in claim 1 in which the temperature control device comprises a thermal probe supplied by a constant current generator and mounted on the block for producing an output signal which is proportional to the temperature of said block; a constant current generator including a variable resistance permitting variation of the reference signal value to the signal value corresponding to the desired temperature; a comparator of the signals from the probe and the generator; and circuits for controlling the power supply to the heating coils or the valve controlling the cooling device depending on the difference between these two signals.

8. An apparatus as claimed in claim 7 in which the comparator is an operational amplifier mounted in a differential amplifier; and the circuits for controlling the power supply to the heating coils or the valve comprise threshold circuits and relays for bringing about the closing or opening of the control circuits of said heating coils or said valve.

9. Apparatus as claimed in claim 1 in which the heat-insulated enclosure has two sealed portholes facing apertures in opposite sides of said block to permit the passage of a light beam from a measuring apparatus through the block.

10. Apparatus as claimed in claim 9 in which the portholes consist of a capsule made of transparent material embedded in the wall of said heat-insulated enclosure, there being a vacuum of about 10–10–6 mm.Hg. in said capsule.

11. Apparatus as claimed in claim 10 in which the transparent material from which said capsules are made is quartz.

12. Apparatus as claimed in claim 1 in which said sample container is of tapered cross section and has holes provided in the lower part of the container to permit the passage through the sample of a light beam from a measuring apparatus.

13. Apparatus as claimed in claim 12 in which the sample container comprises; a funnel formed in the upper part of the container containing the sample to be studies which funnel serves as an expansion vessel for the sample; disks of transparent material sealingly fixed to the walls of the container, the said disks sealing up the holes in the lower part of said container.

14. Apparatus as claimed in claim 13 in which said transparent disks are made of quartz.

15. Apparatus as claimed in claim 1 in which the block comprising a cavity of tapered cross section is made of any metal or alloy having good thermal properties in the temperature range 77°–320° K.